No. 816,464. PATENTED MAR. 27, 1906.
W. HECKERT.
ENGINE.
APPLICATION FILED OCT. 4, 1904.

WITNESSES:

INVENTOR
William Heckert
BY
his ATTORNEYS.

No. 816,464. PATENTED MAR. 27, 1906.
W. HECKERT.
ENGINE.
APPLICATION FILED OCT. 4, 1904.

WITNESSES:

INVENTOR
William Heckert
BY
his ATTORNEYS.

No. 816,464. PATENTED MAR. 27, 1906.
W. HECKERT.
ENGINE.
APPLICATION FILED OCT. 4, 1904.

WITNESSES:

INVENTOR
William Heckert
BY
his ATTORNEYS.

No. 816,464.

PATENTED MAR. 27, 1906.

W. HECKERT.
ENGINE.
APPLICATION FILED OCT. 4, 1904.

WITNESSES:

INVENTOR
William Heckert
BY
his ATTORNEYS.

UNITED STATES PATENT OFFICE.

WILLIAM HECKERT, OF FINDLAY, OHIO, ASSIGNOR OF ONE-HALF TO HENRY W. SENEY, OF TOLEDO, OHIO.

ENGINE.

No. 816,464.  Specification of Letters Patent.  Patented March 27, 1906.

Application filed October 4, 1904. Serial No. 227,168.

*To all whom it may concern:*

Be it known that I, WILLIAM HECKERT, a citizen of the United States, residing at Findlay, in the county of Hancock and State of Ohio, have invented certain new and useful Improvements in Engines; and I do hereby declare the following to be a full, clear, and exact description of the invention, such as will enable others skilled in the art to which it appertains to make and use the same.

An efficient type of engine, combining in a compact unitary structure a gas-engine, steam-engine, and boiler, is that known as the "trimotor," examples of which are illustrated and described in my prior United States patents, No. 708,637, of September 9, 1902; No. 764,808, of July 12, 1904, and my pending application for patent, filed May 18, 1903, Serial No. 157,608. These engines when used as power-machines are characterized principally by a construction comprising a cylinder whose working piston is operated by action of explosive gases on one side and steam on the opposite side, a surrounding water-space, which serves both as a water-jacket for the gas end or combustion-chamber of the cylinder and as the boiler for generation of steam, an annular series of fire-flues around the cylinder, in communication with the combustion-chamber and extending through said surrounding water-space to an exhaust-passage, serving to conduct off the hot gases and heat the boiler-water, and, further, a subjacent water-passage for feed-water, extending from the source of supply to the boiler in a zigzag or serpentine course, in association with a similar exhaust-passage for the gases and products of combustion, which are thus economically utilized in continuously and increasingly heating the feed-water on its way to the boiler. Among many valuable characteristics such engines have the great advantages of economy in the use of fuel, deriving the highest attainable power and heat therefrom, complete utilization of the heat in heating the boiler-water at the high temperature of combustion and heating the inflowing feed-water by the lower temperature of the exhausting gases, and simplicity, compactness, and high comparative efficiency resulting from the combination in one structure of the gas-engine, boiler, and steam-engine, and perfect utilization of all power and heat derived from the explosions or combustions.

My present invention, while embracing certain features of improvement susceptible of general utility in gas and steam engines, is particularly applicable to trimotors or combined gas and steam engines of the character above noted. It is aimed to bring such machines to a still higher degree of perfection and efficiency, to produce a very simple, light, and compact multiple-cylinder engine of comparatively great power, to improve the general construction and mechanical appointments thereof, to operate the steam-valves, gas-valves, and igniters from the same rod or stem, to provide improved means for controlling the steam admission and exhaust for operating the gas-igniters and the exhaust-valves, and for reversing or stopping the engine, to lessen the amount of explosive charges required, and to utilize more perfectly the heat of the gases both in heating the boiler-water and in heating the inflowing feed-water.

My new engine is especially valuable for automobiles, boats, and other vehicles where the smallest and lightest attainable motor having the requisite efficiency and power is desired. Such use is exemplified in the specification and drawings of United States patent to Earl A. Wheeler, No. 777,824, of December 20, 1904, wherein the motor is represented mounted upon and operatively connected with a traction-wheel adapted for pulling a vehicle or other object.

A preferred embodiment of my invention, comprising a two-cylinder engine of the character stated, is represented in the accompanying drawings, which form a part of this specification. This illustrated motor will be fully described and the novel features, improvements, combinations, and general construction constituting my invention will then be particularly pointed out, and defined in the annexed claims.

In said drawings.

6 is a fragmentary longitudinal vertical section taken through the steam-chest between the cylinders.

Letter A denotes a base upon which is mounted the engine-bed B. This base is shown hollow and may serve as a tank from which feed-water is supplied to the water-space or boiler surrounding the cylinders. The bed B is likewise hollow and may serve as an exhaust-chamber for the steam and gases.

C C designate the cylinders, whose working pistons P P are impelled in opposite directions by the action of explosive or combustible gases upon one side and by steam upon the opposite side. The cylinders are provided with surrounding water-spaces, serving as a water-jacket for the combustion-chambers and constituting an internally-fired boiler. These water-spaces merge into each other above and open into a surmounting steam-dome D.

E is a steam-chest arranged between the cylinders, to which steam is conducted from the dome D through a stand-pipe d. The steam-chest communicates with the rear or steam ends of the cylinders by ports e, which are controlled by a rotary valve V, so as to admit live steam to each cylinder on forward stroke of its piston and exhaust the same during the reverse stroke, the steam being supplied to the two cylinders alternately, since, of course, one piston travels forward while the other travels rearward. The valve V will be more particularly described later.

The gasification devices may be of any appropriate type and construction. Those shown are similar in construction and operation to the devices described in my aforesaid patent, No. 764,808, and application Serial No. 157,608. The front cylinder-head of each cylinder is shown having a generating-chamber c, into which gas, atomized oil, naphtha, or other suitable fuel is injected at c', and wherein by reason of the intense heat to which it is subjected the said oil or gaseous fuel is vaporized. The vaporized oil or gas then passes through a port $c^2$ into a mixing-chamber $c^3$, wherein it is mixed with air, and from said mixing-chamber the commingled air and vapor pass through the valve $c^4$ into the combustion-chamber of the cylinder. Air is supplied to the mixing-chambers $c^3$ through feed-pipes $c^5$, which preferably pass through the hollow base or chamber B, so as to take heat from the exhaust-gases therein, and thus furnish hot air for admixture with the hot vapor.

The gas-engine in the present illustration is of the usual four-cycle type. Considering each cylinder separately an explosive charge or admixture is admitted thereinto during a reverse stroke of its piston, compressed on the next forward stroke, and fired or exploded at the proper time by means of any suitable igniter, thus forcing back or impelling the piston on the second reverse stroke, while on the next forward stroke the expanded gases and products of combustion are exhausted.

F indicates fire-flues, an annular series of which surrounds each cylinder extending through its surrounding water-space from an annular gas-space G at the front or gas end of the cylinder to a distinct gas-space G' at the rear or opposite end, thus connecting said gas-spaces. The hot gases resulting from ignition of the explosive charges pass through these tubes, and thus heat the surrounding water, which also takes up the heat from the cylinder-walls. The front gas-spaces G may be distinct from the combustion-chambers of the cylinders, and the spent gases and residues of combustion may be simultaneously exhausted thereinto, as exemplified in my aforesaid patent, No. 703,687; but preferably the said spaces G open directly into the combustion-chambers, and the gases are exhausted from the opposite gas-spaces G', as described in my Patent No. 764,808 and application Serial No. 157,608. Thus the front ends of the fire-flues open into the combustion-chambers and receive a portion of the combustible charges, so that upon ignition the heat is transmitted through the walls of the tubes under the initial high pressure and temperature of combustion, when the heating capacity of the gases is exceedingly high.

Figures 3, 4:
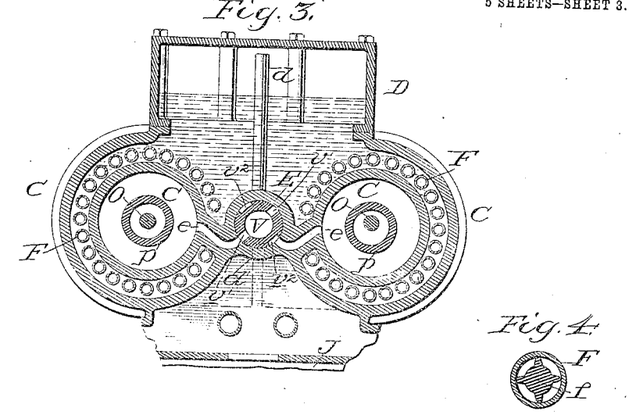
Fig. 3 is a cross-section through the cylinders.
Fig. 4 is a detail cross-section through one of the fire-flues.
Figure 5:
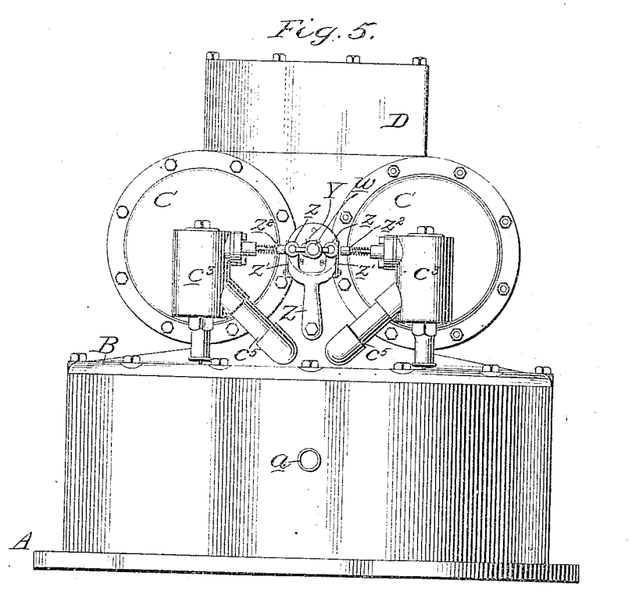
Fig. 5 is a front elevation of the engine. Fig.
Figure 6:
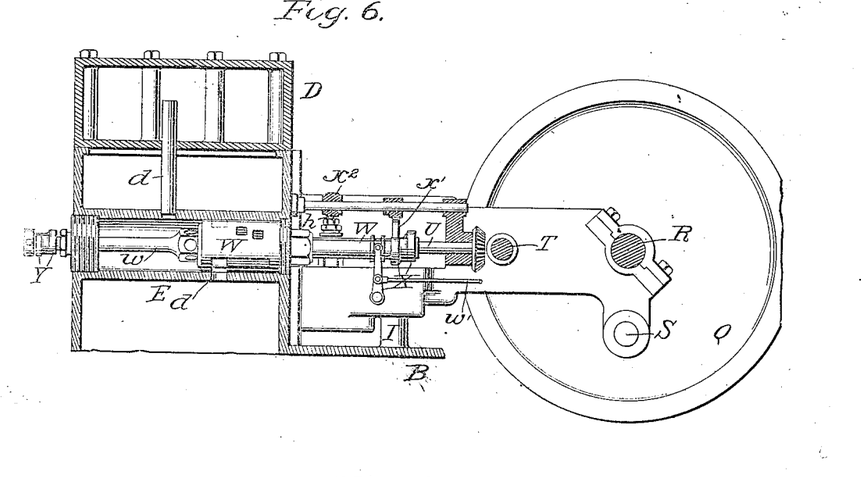

In order to lessen the amounts of explosive charges required, to increase the compression thereof, and to further increase the transmission of heat through the fire-flues, I have devised the plan of introducing one or more solid cores of iron or other suitable material inside the tubes, as illustrated, for example, in Fig. 4, where the core f is shown slightly less in diameter than the internal diameter of the tube and centralized therein by ribs or projections, leaving a slight annular space of about one-eighth inch around the core. By this means the capacity of the whole gas-chamber is reduced by the total cubic measurement of all the cores, while the hot gases pass through the fire-flues only in their confined annular spaces adjacent to the heat-transmitting surfaces.

From the rear gas-spaces G' the gases are exhausted at proper intervals (on the forward exhaust-strokes of the respective pistons) through exhaust-valves H, shown located in passages communicating with said gas-spaces. The gases when expelled pass through pipes I into the exhaust-chamber in the bed B, thence through a winding serpentine, or convolute passage J, and, finally, into the water-tank A, from which the gases may escape through a vent $a$, located above the water-level.

Figure 7:
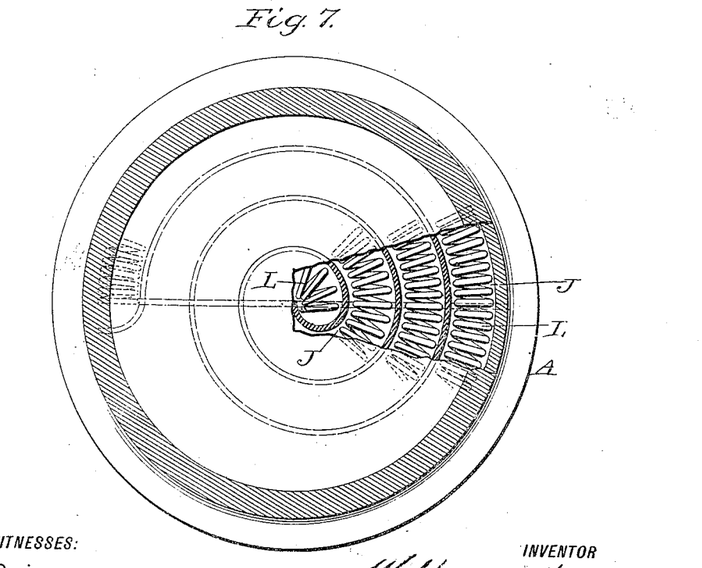
Fig. 7 is a horizontal section through the engine-bed, showing the top of its subject fire-passage partly broken away to disclose the coils of the feed-water pipe.

Water taken from the tank A is forced by a feed-pump K up to the boiler through a pipe L, which is arranged in close spiral coils within the winding fire-passage J. (See Fig. 7.) Thus the small coils of the water-pipe form a sort of wound tubing, which is arranged in large convolutions in the fire-passage. By this means an exceedingly large number of water-coils are subjected to the heat of the exhausting gases in only a small length of the passage, and owing to the great length of this passage and the relatively much greater length of water-coils inclosed therein the association of the inflowing water with the outgoing gases is such as to take up all available heat. The principle here applied of heating the inflowing feed-water by the exhaust-gases is similar to that set forth in my former patents, but is practiced in a higher degree, utilizing practically every vestige of heat of the gases by reason of the winding form and consequent length of the fire-passage, the great number of close small water-coils, and the tendency of the hot gases to linger in their winding course. Moreover, the construction is simple and very compact, since the whole number of large convolutions of small coils may be arranged in one layer or in a single horizontally-disposed chamber, as shown.

O O denote the connecting-rods or pitmen, connecting the pistons P P with crank fly-wheels Q Q. It is desirable to provide the pistons with reduced trunks $p$ to reduce the capacities of the steam sides of the cylinders and to permit direct attachment of the connecting-rods to the piston-heads, which is conducive to compactness. Such a construction is represented in the present illustration, and the trunks $p$ are further shown provided with cross-heads M, sliding in guideways N, which latter are tubular extensions projecting from the rear cylinder-heads.

Figure 1:
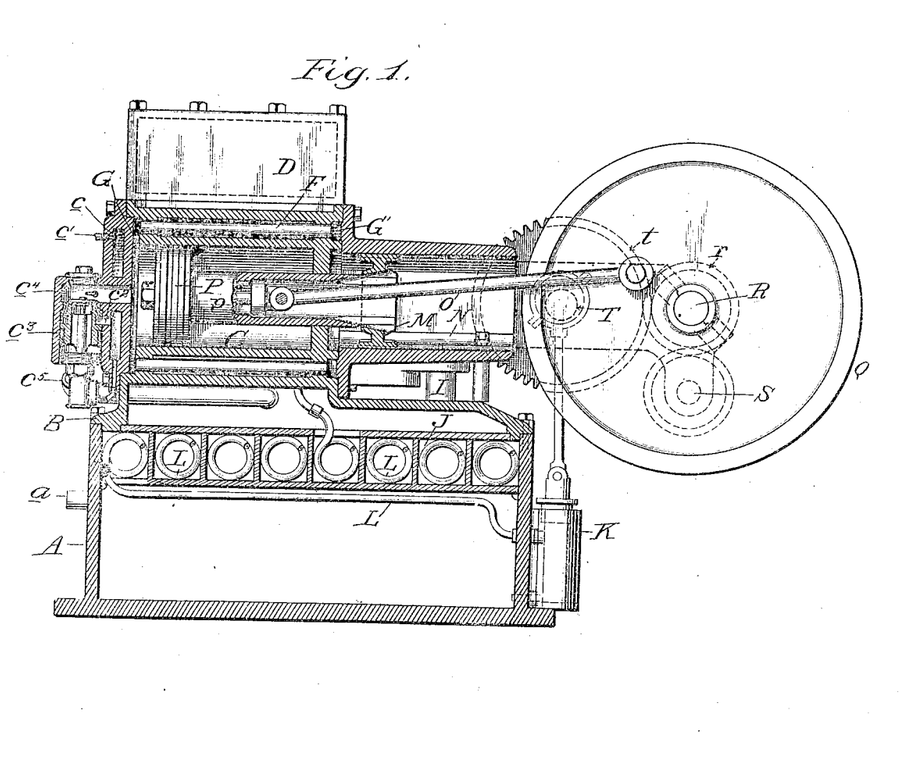
Figure 1 is a longitudinal vertical section of the engine, ta'.en through one of the cylinders.
Figure 2:
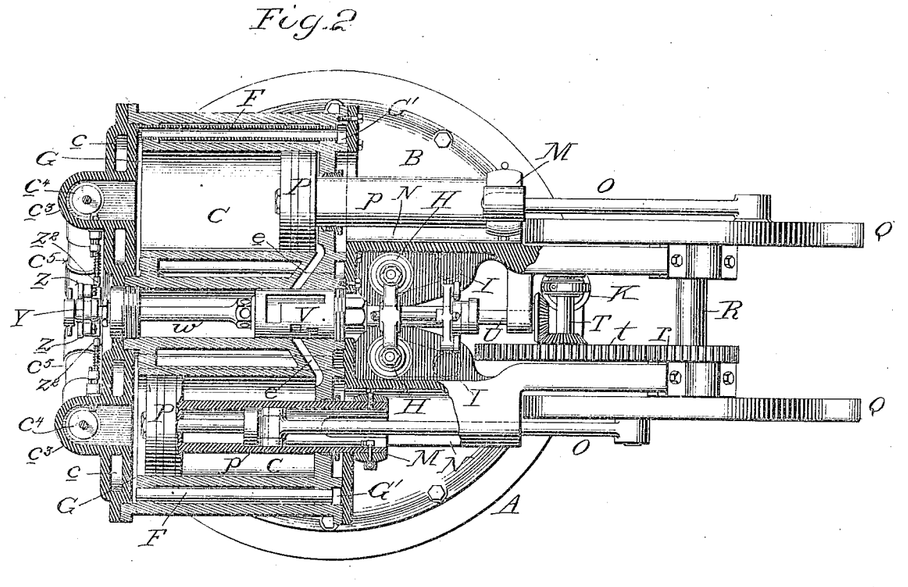
Fig. 2 is a top plan view with the cylinders in longitudinal horizontal section.

R is the crank-wheel shaft, and S and T are transmission-shafts geared therewith. The bearings for these shafts are shown provided in arms extending from the tubular guideways N. Thus the cylinders and whole supporting-frame are in one rigid self-sustained structure, and by reference to Fig. 2 it will be observed that the arrangement is such as to equalize the weight with respect to the center of the base. The base A and engine-bed B are shown circular, which is to permit pivotally mount g the engine in a frame, where it is used as a wheeled motor and provided with steering mechanism, as in the aforesaid Wheeler patent, No. 777,824. These features of general construction are not essential; but they contribute to the lightness and compactness of the machine and its adaptation for use as a traction-motor. Shaft S is designed for transmitting power to the wheel or mechanism to be driven and may be connected with any suitable power-transmission or variable-speed mechanism. Shaft T drives the valve-shaft U, which is geared therewith by bevel-pinions. It is driven from the crank-shaft by gears $r$ $t$ at a speed of one rotation to every two rotations of the crank-shaft and imparts the same timing to the valve-shaft U.

Before describing the valve V it may be stated that said valve is a rigid structure with a rear sleeve W and a front rod $w$, said sleeve and rod being journaled in the stuffing-boxes at opposite ends of the cylindrical steam-chest E. The sleeve W carries the gas-exhaust-valve-operating cams X, while the rod $w$ carries the igniter-cams Y. Said sleeve is splined on the shaft U, so as to rotate therewith and slide thereon, and by means of a rod $w'$ or lever or other device connected to the sleeve the valve V, together with cams X and Y, can be shifted longitudinally, which is for the purpose of starting, stopping, and reversing the engine, as hereinafter explained.

The valve V is a cylindrical hollow box or shell rotating closely within the steam-chest E. Steam is admitted thereinto through suitable apertures or ports, as at $v$. The valve has two diametrically opposite admission-ports $v'$, consisting of openings through its walls and two intermediate and diametrically opposite exhaust-ports $v^2$, consisting of longitudinal channels which by means of circumferential ways or channels $v^4$ can communicate with the steam-exhaust pipe $d'$ as the respective exhaust-ports $v^2$ register with the respective ports $e$. Said ports $e$, leading from the steam-chest to the steam ends of the cylinder, are so located that when an admission-port $v'$ registers with one port $e$ an exhaust-port $v^2$ also registers with the other port $e$, thus admitting steam to one cylinder while exhausting from the other. Inasmuch as the valve rotates once to every two rotations of the crank-shaft, the valve is timed to bring the four ports successively in registration with each port $e$ during such two rotations of the crank-shaft. Hence an inlet-port $v'$ is caused to register with the port $e$ of each cylinder, so as to admit live steam behind its piston at the completion of every rear stroke, while an exhaust-port $v^2$ is caused to register therewith and exhaust the dead steam at the end of each forward stroke. The positions and sizes of the inlet-ports $v'$ with relation to the ports $e$ determine, of course, the times of admission and cut-off. For the purpose of reversing the engine an extra set of inlet-ports $v^3$ are provided in the valve behind the ports $v'$, but not in alinement therewith, but offset, so as to admit steam at a different period to each cylinder or when the cranks or connections of the pitmen to the crank-wheels are on the opposite sides of the dead-centers to the positions existing when the ports $v'$ register. The engine will run forward or reverse, according to whether the valve is shifted to bring the inlet-ports $v'$ or $v^3$ in registration with the ports $e$, while it may be stopped by shifting of the valve to bring its solid walls between ports $v'$ $v^3$ over the ports $e$. Shifting of the valve is accomplished by the rod $v^4$, as hereinbefore explained.

Figure 8:
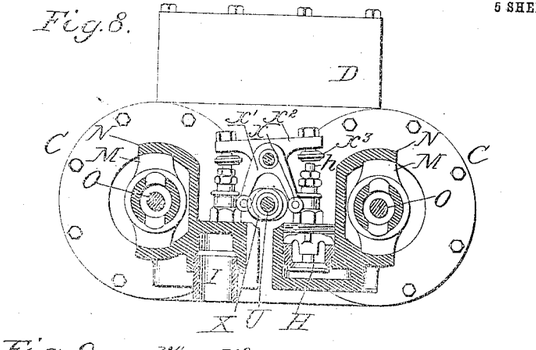
Fig. 8 is a cross-section taken behind the cylinders, partly through one gas-exhaust valve and partly through one gas-exhaust pipe.
Figure 9:
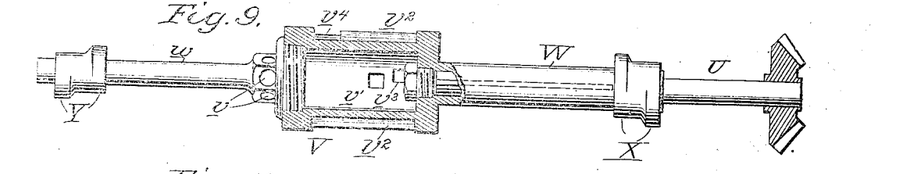
Fig. 9 is a detail view of the rotary structure comprising the valve-shaft, steam-valve, and cams for operating the gas-exhaust valves and igniters, the steam-valve being in longitudinal section.
Figure 10:
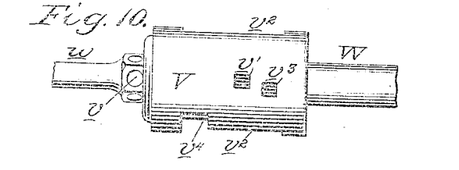
Fig. 10 is a detail elevation of the steam-valve.
Figure 11:
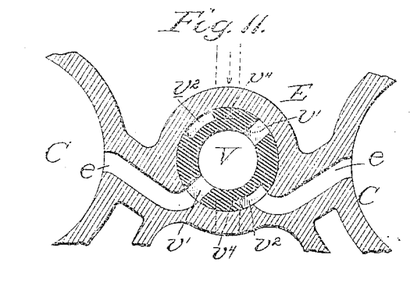
Figs. 11 and 12 are cross-sections through the valves, one being taken through the inlet-ports for driving forward and the other taken through the inlet-ports for reversing.
Figure 12:
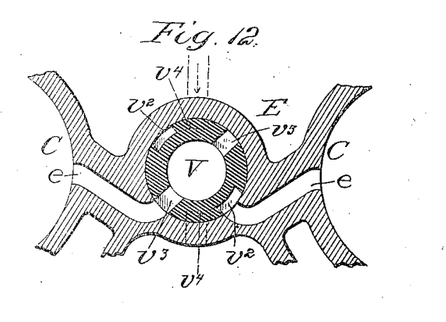

X denotes cams on the sleeve W for operating the gas-exhaust valves H, which, as before mentioned, control the exhaust of the gases from the gas-engines or combustion-chambers of the cylinders. As shown in Fig. 8, these cams rotate between rollers $x$, carried by a rocking yoke $x'$, which actuates a tilting cross-arm $x^2$, carrying tappets $x^3$, adapted to depress the valve-stems $h$, and thus open the valves. There are two of the cams X, with their bulges arranged in different positions and with a dividing-flange, which is inoperative with respect to either roller $x$. When the valve V is shifted to run the engine forward, one cam operates the tappets by engagement with the rollers $x$, and when said valve V is shifted to reverse the engine the other cam operates the same. By virtue of the timing of the valve V and cams each gas-exhaust valve H is opened once in every two rotations of the crank-shaft, the opening occurring, of course, on the forward stroke of the piston, which expels the spent gases after explosion and working stroke. Y denotes similar cams on the rod $w$ for operating a rocking yoke Z, which controls the igniters for the combustion-chambers of the cylinder, the operative cam rocking the yoke by contact with its rollers $z$. The yoke carries spring-arms $z'$, which when rocked strike spring-resisted buttons or knobs $z^2$, the stems of which are thus thrust into the combustion-chambers and make and break an electrical circuit, the resulting spark causing ignition and explosion of the combustible mixture. The spark is of course formed in each combustion-chamber at the proper moment after compression of the gas, which is effected by the timing of the cams.

In place of the valve V a slide-valve or other valve of suitable type and construction may be employed, and any appropriate mechanism may be adopted for operating the sparkers or igniters and the gas-exhaust valves, though the rigid or unitary rotary structure described is preferred for simplicity, compactness, accuracy of timing, and efficiency of operation.

Numerous changes may be made in the details of construction and general arrangement without departing from the scope of my invention, so that I do not desire to be limited to the construction shown except as distinctly stated in the following claims.

I claim as my invention and desire to secure by Letters Patent of the United States—

1. An engine comprising, in combination, a plurality of longitudinally-arranged cylinders whose working pistons are impelled in opposite directions by action of combustible gas on one side and steam on the other side, means controlling the admission, ignition and exhaust of gas for the proper times for the different pistons, a water-chamber surrounding the cylinders and having a surmounting steam-dome, a steam-chest common to the cylinders having communication with the steam-dome, and a valve working in said steam-chest controlling the admission and exhaust of steam at the proper times for the different cylinders.

2. An engine comprising, in combination, a plurality of longitudinally-arranged cylinders whose working pistons are impelled in opposite directions by action of combustible gas on one side and steam on the other side, suitably-timed gas inlet and exhaust valves and igniters for the combustion-chambers, annular water-spaces surrounding the cylinders and merging into a common steam-dome, fire-flues extending through said annular water-spaces for conducting the hot gases of combustion therethrough, a common steam-chest located between the cylinders, a pipe supplying the same with steam from the steam-dome, and a valve working in said steam-chest controlling admission and exhaust of steam for the steam sides of the cylinders.

3. An engine comprising, in combination, a base constituting a water-tank; a bed-frame thereon comprising in a rigid structure two parallel cylinders, an intermediate common steam-chest, outer shells providing annular water-spaces and merging into a surmounting steam-dome, and extensions from the rear cylinder-heads supporting the bearings for the crank-shaft; a crank-shaft journaled in said bearings having crank-wheels connected to the working pistons; a valve in said steam-chest automatically controlling admission and exhaust of steam to one side of each piston; means for automatically introducing, igniting and exhausting combustible gas at the opposite side of each piston; fire-flues extending through the said water-spaces for receiving the hot gases; a serpentine exhaust-passage in communication with said fire-flues; and a similar passage for the inflowing feed-water in association therewith.

4. An engine having, in combination a plurality of longitudinally-arranged cylinders whose working pistons are impelled in opposite directions by action of combustible gas on one side and steam on the other, an intermediate steam-chest, a surrounding water-chamber in which the water is heated by the hot gases, a steam-dome from which steam is supplied to said steam-chest, a rotary valve in said steam-chest supplying steam alternately to the respective cylinders, and gas-control devices operated by rotation of said valve.

5. An engine having, in combination, two cylinders with oppositely-moving pistons, an intermediate steam-chest, a hollow rotary valve therein rotating once to every two rotations of the crank-shaft, said valve having openings for admission of steam thereinto and diametrically opposite inlet-ports therethrough and intermediate diametrically opposite exhaust-ports consisting of outer channels adapted to communicate with the exhaust, and ports leading from the steam-chest to the cylinders located so that an exhaust-port registers with one cylinder-port when an inlet-port registers with the other cylinder-port.

6. An engine having, in combination, a cylinder whose working piston is driven by combustible gas, a surrounding water-space or boiler, a series of fire-flues extending through said water-space having communication at one end with the combustion-chamber, a winding or convolute fire-passage with which said flues communicate at the opposite end, and a feed-water pipe arranged in large convolutions composed of close spiral coils throughout said winding fire-passage.

7. A combined gas and steam engine wherein the hot gases are utilized for heating water for generation of steam, a winding exhaust-passage for such gases, and a feed-water pipe arranged in close spiral coils in said passage.

8. An engine having, in combination, a cylinder, means for driving its working piston by expansion of combustible gases, a surrounding water-space, fire-flues extending therethrough communicating with the combustion-chamber, a convolute fire-passage into which the gases exhaust from said flues, and a feed-pipe for supplying water to said water-space extending through said convolute fire-passage.

9. An engine having, in combination, a cylinder whose working piston is impelled by action of combustible gases, a surrounding water-space, a series of fire-flues extending therethrough communicating with the combustion-chamber, and solid cores or rods of smaller diameter than the internal diameters of said flues introduced within said flues, substantially as and for the purpose described.

10. An engine having, in combination, a cylinder whose working piston is impelled by action of combustible gases, a surrounding water-space, a series of fire-flues extending therethrough communicating with the combustion-chamber, and cores or rods of slightly-smaller diameter than the internal diameters of said flues introduced and centered within said flues, substantially as and for the purpose described.

11. An engine having, in combination, a cylinder in which gas works on one side of the piston and steam on the other, and an automatically-driven unitary structure or device operating the steam-valve and also the gas-exhaust valve, and means for controlling said valves to drive, stop or reverse the engine by adjustment of said structure.

12. An engine having, in combination, a cylinder in which gas works on one side of the piston and steam on the other, an igniting device, exhaust-valve for the gas side, and a rotating structure comprising a rotary valve controlling admission to and exhaust of steam from the steam side and cams for operating said igniting device and exhaust-valves.

13. An engine having, in combination, a cylinder in which gas and steam work on opposite sides of the piston, a rotary valve controlling the admission and exhaust of steam, a gas-exhaust valve, and controlling mechanism therefor operated from the valve-shaft of said rotary steam-valve.

14. An engine having, in combination, a cylinder in which gas and steam work on opposite sides of the piston, igniting mechanism, gas-exhaust-valve mechanism, and a rotary structure comprising a rotary valve controlling admission and exhaust of steam, and capable of being shifted longitudinally and thereby driving, stopping or reversing the engine, and gas-exhaust-valve-operating cam and igniter-operating cam rotary and shiftable therewith for properly controlling said gas-valve mechanism and igniting mechanism whether said steam-valve is moved to drive the engine forward or reversely.

15. An engine having, in combination, a cylinder in which steam works on one side of the piston and gas on the other, a steam-valve, igniter, and gas-exhaust valve, and an automatically-driven actuator having means for operating said steam-valve, igniter and gas-exhaust valve, said actuator being susceptible of adjustment, and means for controlling the mechanisms actuated thereby to drive, stop or reverse the engine by such adjustment.

16. An engine having, in combination, a cylinder in which steam works on one side of the piston and gas on the other, a steam-valve, igniter, and gas-exhaust valve, and an automatically-driven actuator having means for operating said steam-valve, igniter and gas-exhaust valve, and means for starting, stopping and reversing the engine operated by said actuator.

In testimony whereof I affix my signature in presence of two witnesses.

WILLIAM HECKERT.

Witnesses:
ALFRED WILLIAMS,
NEULA HECKERT.